(12) United States Patent
Corn et al.

(10) Patent No.: US 8,157,620 B2
(45) Date of Patent: Apr. 17, 2012

(54) SYSTEM AND METHOD FOR CLEANING STATOR SLOTS

(75) Inventors: Randall S. Corn, Travelers Rest, SC (US); Douglas A. Serieno, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 784 days.

(21) Appl. No.: 12/342,553

(22) Filed: Dec. 23, 2008

(65) Prior Publication Data

US 2010/0159814 A1    Jun. 24, 2010

(51) Int. Cl.
*B24B 1/00* (2006.01)
(52) U.S. Cl. ............................. 451/57; 451/61; 451/524
(58) Field of Classification Search ............... 451/552, 451/554, 559, 52, 54, 57, 61, 28, 495, 520, 451/523–525; 15/104.001, 104.05, 246
See application file for complete search history.

(56) References Cited

U.S. PATENT DOCUMENTS

| 6,019,853 | A  | * | 2/2000 | Banville et al. | 134/6 |
| 7,412,741 | B2 | * | 8/2008 | Roney et al. | 15/104.001 |
| 7,735,222 | B2 | * | 6/2010 | Sherlock et al. | 29/889.1 |

* cited by examiner

*Primary Examiner* — Dung Van Nguyen
(74) *Attorney, Agent, or Firm* — Ernest G. Cusick; Frank A. Landgraff (57) ABSTRACT

A system and method for cleaning receiver slots with hook-fits for stator blade ring segments. A first cleaning tool with an abrasive coating and sideward projection in the shape of the hook is slid through the slot using the hook-fit as a guide. A second cleaning tool with an abrasive coating and a formed/machined hook-fit used as a guide while cleaning the receiver slots as it is pushed through the receiver slots. The tools remove trash, oil rust/oxidation, and other foreign materials from receiving slot. Both tools may attach to a metal rod with two knuckles as part of the handle that connects to and uses the hook-fit as a guide enabling the operator to reach deep into the radius of the compressor case receiver slots and hook-fits located adjacent to and beneath the rotor and rotor blades so that the hook-fit and receiver slot can be thoroughly cleaned.

20 Claims, 12 Drawing Sheets

SYSTEM AND METHOD FOR CLEANING STATOR SLOTS

BACKGROUND OF THE INVENTION

The field of the invention relates generally to gas turbine engines, and more particularly, to a system and method for cleaning receiver slots after stator ring segments or singlet blades have been removed from a turbine engine.

At least some known gas turbine engines include, in serial flow arrangement, a high-pressure compressor for compressing air flowing through the engine, a combustor wherein fuel is mixed with the compressed air and ignited to form a high temperature gas stream, and a high pressure turbine. Hot combustion gases are channeled downstream from the combustor towards the turbine, wherein energy is extracted from the combustion gases for use in powering the compressor, as well as producing useful work to propel an aircraft in flight or to power a load, such as in an electrical generator. Some known gas turbine engines may also include a low-pressure compressor, or booster compressor, to supply compressed air to the high pressure compressor.

Known compressors include a compressor casing that may include upper and lower casing sections that are coupled about a rotor assembly. Known compressors include a plurality of alternating rows of circumferentially-spaced stator and rotor blades. Each row of rotor and stator blades includes a series of airfoils that each include a pressure side and a suction side that are coupled together at leading and trailing edges. Each stator blade airfoil extends radially inward from a stator support ring that is inserted into channels (receiver slots) that are circumferentially formed in axial succession within a radially-inner side of the combustor casing. Each stator ring segment is sized and shaped to receive a plurality of stator blade segments that extend circumferentially in a row between a pair of adjacent rows of rotor blade assemblies. Alternatively for some stages of a gas turbine compressor, a root of a platform for singlet blades may directly inserted into the channels (receiver slots) of the casing without the need for an intervening stator ring segment.

During operation, leading and trailing edges and/or an outer tip of the stator blade may deteriorate or become damaged due to oxidation, thermal fatigue cracking, or erosion caused by abrasives and corrosives in the flowing gas stream. Over time such deterioration may cause some known stator blades to fail, resulting in the airfoil portion becoming detached from a dovetail portion of the blade. In some instances, blade failures have caused catastrophic damage within their engine. To facilitate mitigating such operational effects, blades are periodically inspected for damage, to enable a determination of an amount of damage and/or deterioration to be made. Blades are generally replaced if the damage and or deterioration meets a certain pre-determined threshold. Alternatively, if the blades have not lost a substantial quantity of material, the blades may be repaired.

For example, at least one known method of replacing stator ring segments requires the removal of the upper compressor section casing and rotor assemblies. Following rotor assembly removal, each stator blade segment is heated and after reaching a desired temperature, the segment is quenched to facilitate rapid cooling. Each segment is then withdrawn from its respective channel using, for example, a pneumatic peening hammer. A newly fabricated segment is then inserted into the casing channel. Alternatively, after being removed from the rotor assembly, each damaged or deteriorated segment is repaired and refurbished prior to being replaced within the casing channel. However, rotor assembly removal, reinsertion, and compressor reassembly may be a time-consuming and expensive process that may significantly increase repair time and power generator outages. Such concerns are similarly applicable to the removal of singlet blades inserted directly into the receiver slots.

Methods and systems have been proposed, for example by Corn et al. (U.S. Ser. No. 12/110,729 filed Apr. 28, 2008), for removal of stator ring segments without removal of the rotor. After the removal of the stator blades (including segmented stators) in the axial compressor portion of a gas turbine, the receiver slots and hook-fits must be cleaned to receive the new stators (stator ring segment or singlet blade). If not cleaned properly, the new stator(s) may become bound or locked up while re-installing stators before achieving the final assembly position, thereby causing irreversible damage to the stator components and/or may create the need to remove the rotor as a means to mitigate bound stators, which significantly increases cost for the operation.

Because the rotor is closely fitted to the mid-compressor case, it is geometrically difficult to reach the areas that must be cleaned. Additionally, the use of grinders utilizing aluminum oxide wheels create residual dust and foreign object damage that is not desired within the axial compressor gas path. Moreover, the extended reach necessary to access the areas to be cleaned underneath the rotor and rotor blades creates an ergonomic issue potentially leading to operator injury.

A current process to clean receiver slots and hook-fits prior to stator re-installation utilizes a ninety-degree pneumatic grinder, fitted with aluminum oxide grinding discs, and/or other light abrasive wheels as a means to clean trash, oil, rust/oxidation, and other foreign materials from receiver slots and hook-fits to clear the path for the new stators. The desired process for stator removal requires the rotor to remain in place making access to the areas to be cleaned difficult. The dust and grit remaining in the unit after cleaning inherently related to the cleaning process can also cause binding of the new stators during installation and is not a desired condition in the gas path of the axial compressor.

Accordingly, there is a need for a method to clean the receiver slots and hook-fits for removed stators of trash, oil, rust/oxidation, and other foreign materials so as to provide a clear insertion path for the new stators. The cleaning method should be performed while the rotor remains in place and should not damage the receiver slots.

BRIEF DESCRIPTION OF THE INVENTION

According to a first aspect of the present invention, a system is provided adapted for cleaning a plurality of receiver slots for stators of a multistage gas turbine compressor with a rotor in place. The system includes a hookfit cleaning tool, adapted for cleaning a plurality of hooks within the receiver slots and a side cleaning tool, adapted for cleaning sidewalls of the receiver slot. A cleaning handle is further provided, adapted for attachment to the side cleaning tool and the hookfit cleaning tool for inserting and retracting these tools into the receiver slot.

According to a second aspect of the present invention, a method is provided for cleaning a plurality of receiver slots for stators of a multistage gas turbine compressor with a rotor in place. The method includes cleaning both sidewalls for a receiver slot in one stage of the gas turbine compressor with a sidewall cleaning tool from a first side of the compressor casing. Both hooks of the receiver slot in the stage of the gas turbine compressor are cleaned with a hookfit cleaning tool from the first side of the compressor casing. Both sidewalls of the receiver slot in the stage of the gas turbine compressor are cleaned with the sidewall cleaning tool from a second side of the compressor casing. Both hooks of the side wall of the receiver slot for the stage are cleaned with the hookfit cleaning tool from the second side of the compressor casing.

BRIEF DESCRIPTION OF THE DRAWINGS

FIG. 6A-6D illustrates an embodiment of a side wall cleaning tool;

DETAILED DESCRIPTION OF THE INVENTION

A system and method for cleaning receiver slots with hookfits for stators of a multi-stage gas turbine compressor with the rotor in place has many advantages. A first cleaning tool with an abrasive coating and sideward projection in the shape of the hook is slid through the slot using the hook-fit as a guide. A second cleaning tool with an abrasive coating and a formed/machined hookfit used as a guide while cleaning the receiver slots as it is pushed through the receiver slots. The tools remove trash, oil, rust/oxidation, and other foreign materials from receiving slot. Both tools may attach to a metal rod with two knuckles as part of the handle that connects to and uses the hook-fit as a guide enabling the operator to reach deep into the radius of the compressor case receiver slots and hook-fits located adjacent to and beneath the rotor and rotor blades so that the hook-fit and receiver slot can be thoroughly cleaned. Cleaning the slots with the rotor in place saves significant time and cost of a major operation of removing the stator. Additionally, the dust and foreign object damage through the use of prior art grinders utilizing aluminum oxide wheels avoided. Moreover, ergonomic issues related to the extended reach necessary to access the areas to be cleaned underneath the rotor and rotor blades and potentially leading to operator injury are also avoided.

Figure 1:
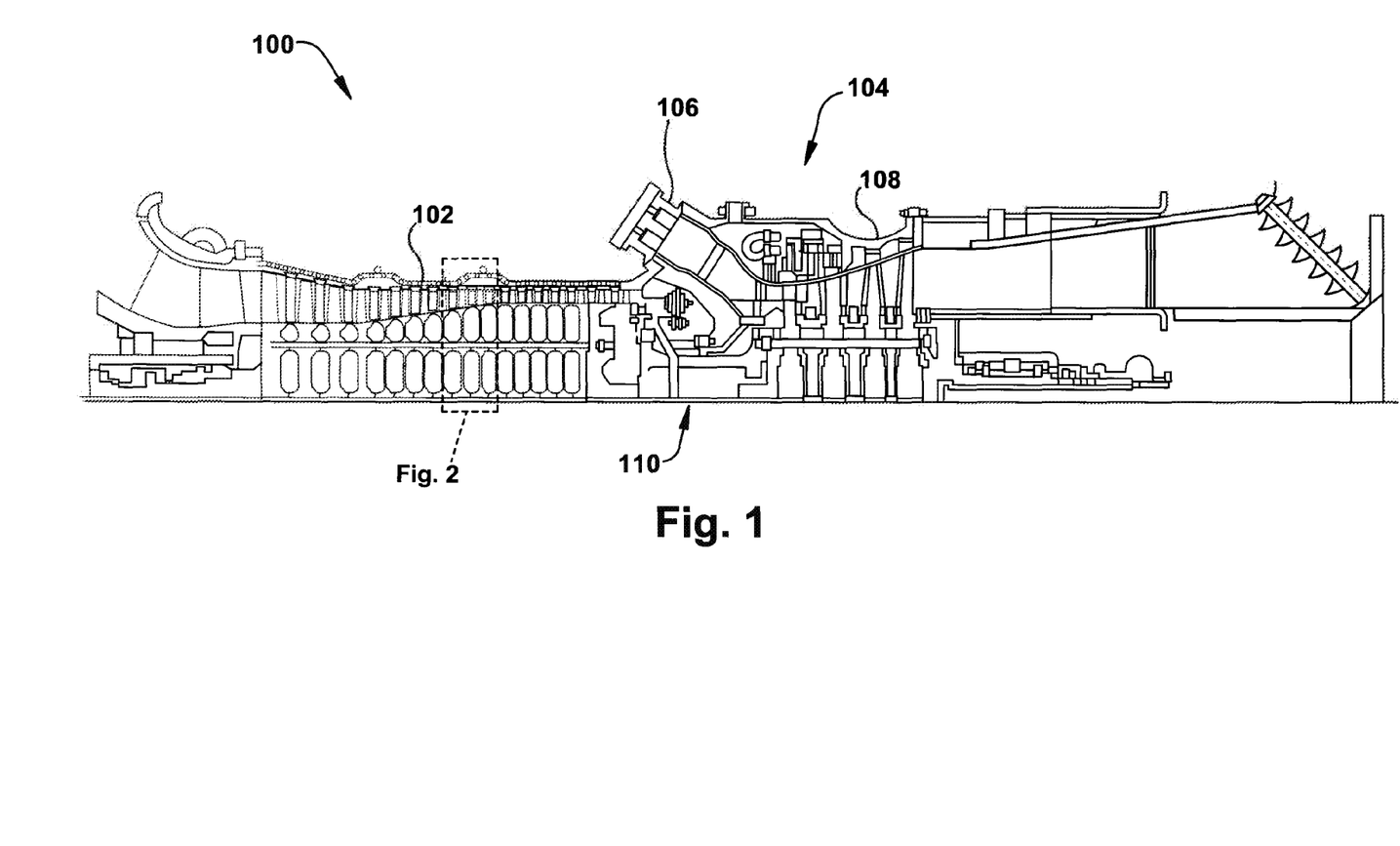
FIG. 1 is a schematic view of an exemplary gas turbine engine.

FIG. 1 is a schematic illustration of an exemplary known gas turbine engine 100. Engine 100 includes a compressor 102 and a plurality of combustors 104. Combustor 104 includes a fuel nozzle assembly 106. Engine 100 also includes a turbine 108 and a common compressor/turbine rotor 110 (sometimes referred to as rotor 110).

Figure 2:
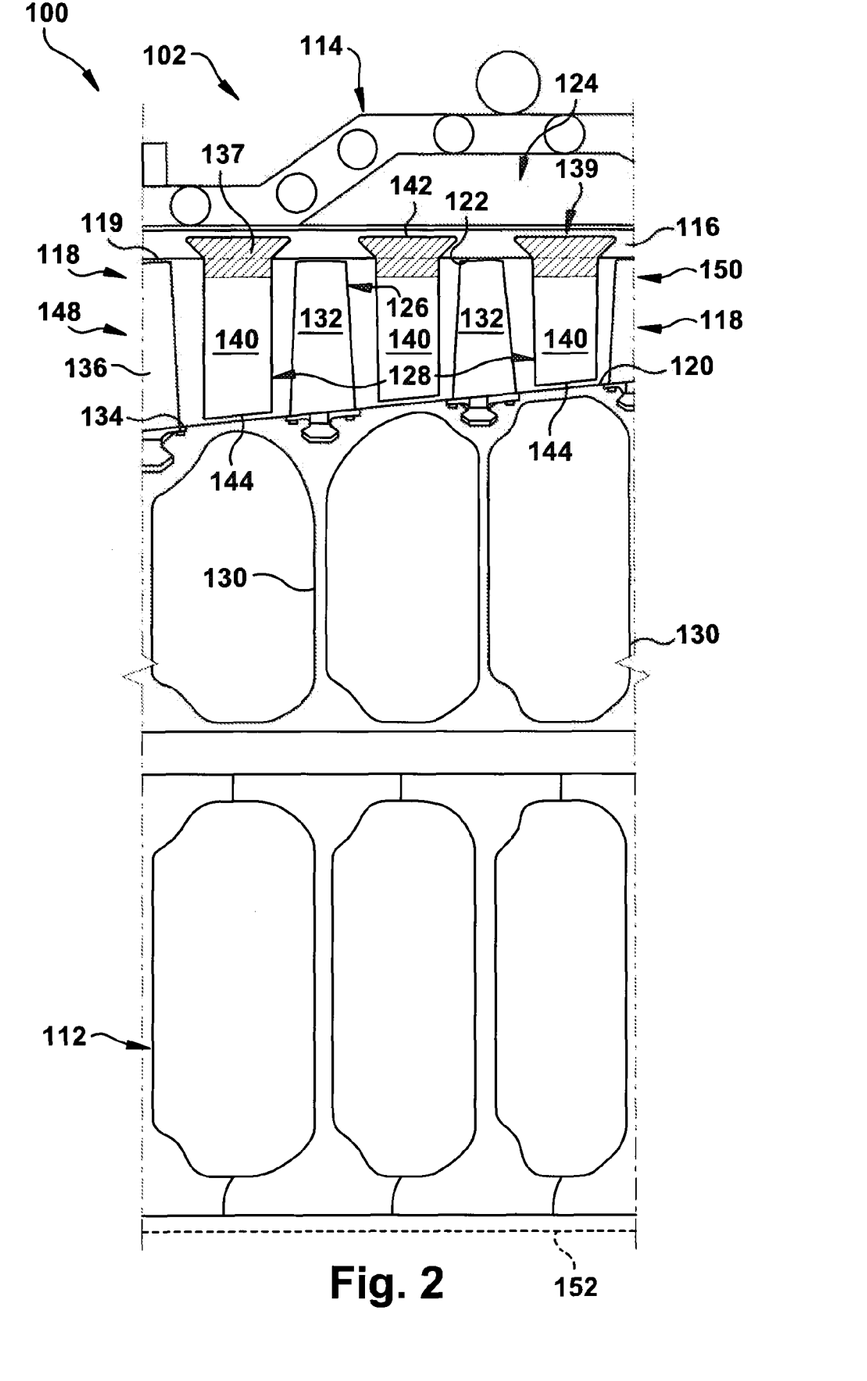
FIG. 2 is an enlarged cross-sectional view of a portion of a compressor that may be used with the gas turbine engine shown in FIG. 1 and taken along area 2.

FIG. 2 is an enlarged cross-sectional view of a portion of a known compressor 102 taken along area 2 (shown in FIG. 1). Compressor 102 includes a rotor assembly 112 and a stator assembly 114 that are positioned within a casing 116 that at least partially defines a flow path 118 in cooperation with at least a portion of a casing radially inner surface 119. In the exemplary embodiment, rotor assembly 112 forms a portion of rotor 110 and is rotatably coupled to a turbine rotor (not shown). Rotor assembly 112 also partially defines an inner flow path boundary 120 of flow path 118, and stator assembly 114 partially defines an outer flow path boundary 122 of flow path 118, in cooperation with inner surface 119. Alternatively, stator assembly 114 and casing 116 are formed as a unitary and/or integrated component (not shown).

Compressor 102 includes a plurality of stages 124, wherein each stage 124 includes a row of circumferentially spaced rotor blade assemblies 126 and a row of stator blade assemblies 128, sometimes referred to as stator vanes. Rotor blade assemblies 126 are coupled to a rotor disk 130 such that each blade assembly 126 extends radially outwardly from rotor disk 130. Moreover, each assembly 126 includes a rotor blade airfoil portion 132 that extends radially outward from a blade coupling portion 134 to a rotor blade tip portion 136. Compressor stages 124 cooperate with a motive or working fluid including, but not limited to, air, such that the motive fluid is compressed in succeeding stages 124.

Stator assembly 114 includes a plurality of rows of stator segment rings 137. Stator segment rings 137 are inserted into passages (also called receiver slots or channels) 139 that extend circumferentially, in axial succession, within at least a portion of casing 116. Each channel 139 is defined to be substantially axially adjacent to a portion of casing 116 that is radially outward from and opposite rotor blade tip portions 136. Each stator segment ring 137 is sized and shaped to receive a plurality of stator blade assemblies 128 such that each row of blade assemblies 128 is positioned between a pair of axially adjacent rows of rotor blade assemblies 126. In the exemplary embodiment, each blade assembly 128 includes an airfoil portion 140 that extends from a stator blade dovetail portion (not shown in FIG. 2) to a stator blade tip portion 144. Compressor 102 includes one row of stator vanes 138 per stage 124, some of which are bleed stages (not shown in FIG. 2). Moreover, in the exemplary embodiment, compressor 102 is substantially symmetric about an axial centerline 152.

Figure 3:
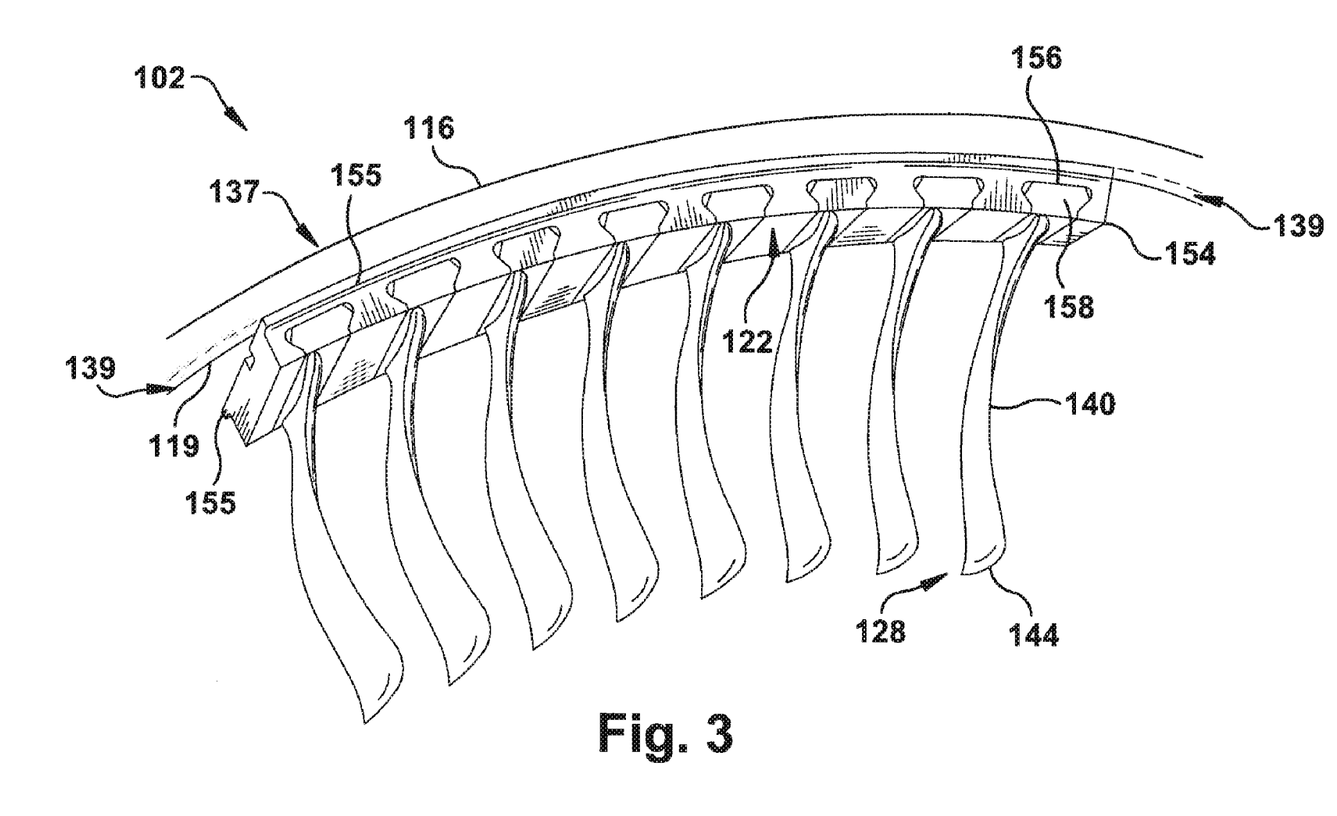
FIG. 3 is a perspective view of an exemplary stator ring segment that may be used with the compressor shown in FIG. 2.

FIG. 3. is a perspective view of a known exemplary stator ring segment 154 that may be used with compressor 102 (shown in FIG. 2). In the exemplary embodiment, ring segment 154 includes a plurality of stator blade passages 156 that are each defined within segment 154. Moreover, each passage 156 is sized and shaped to receive a stator blade assembly 128 therein. Each assembly 128 includes a stator blade dovetail portion 158 that enables stator blade assemblies 128 to be coupled to casing 116 through the segment 154. Stator ring segments 154 may be coupled to casing 116 via coupling methods that include, but are not limited to, a friction fit, the use of retention hardware (not shown), a welding process, and/or any other mechanical coupling means, and forming segments 154 integrally with casing 116. An exemplary friction fit may include a projection 155 on each side of the stator ring segment 154 that engages a corresponding hook (not shown) within channel (slot) 139 in the casing 116. A plurality of stator ring segments 154 are inserted into each receiver slot 139 such that segments 154 extend substantially circumferentially within compressor casing 116 and such that circumferentially adjacent segments 154 abut each other. As such, stator ring segments 154 form at least a portion of outer path flow boundary 122.

Figure 4:
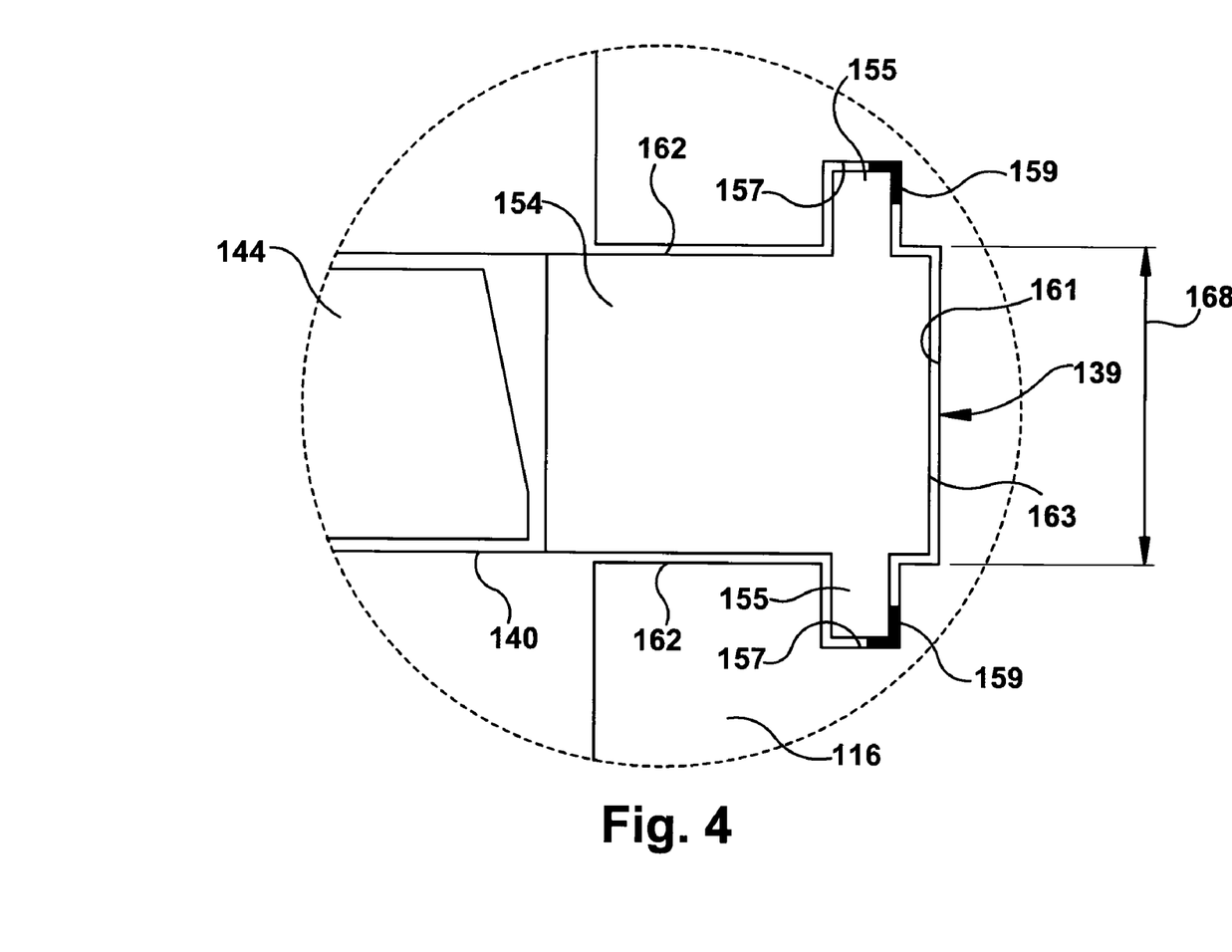
FIG. 4 illustrates a cross-section of a stator ring segment within a receiver slot.

FIG. 4. illustrates a cross-section of a known stator ring segment 154 in the slot 139 in casing 116. The slot 139 includes a base 161, sidewall 162 and hook 157. Stator ring segment 154 is illustrated with side projections 155 configured to the hook 157 of receiver slot 139. The hook and receiver slots may be positioned along the sidewall 162 in various positions, often at the base 161 of the slot. The slot 139 and the hooks 157 extend in an arc around the circumference of the casing. Consequently, cleaning tools that will be described include arc-shaped (arcutate) bodies and side projections to be able to pass through the slot.

Figure 5:
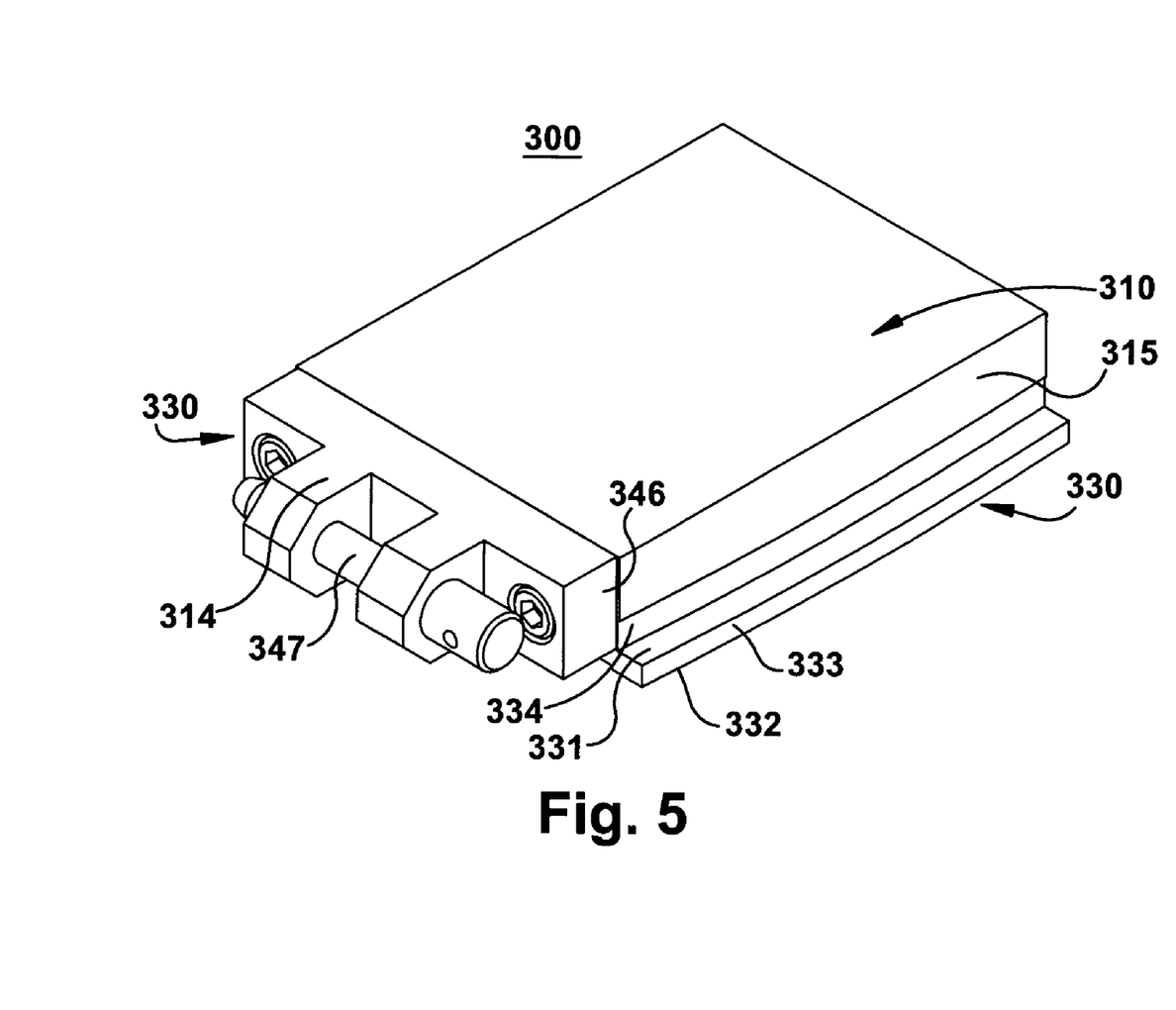
FIG. 5 illustrates an embodiment of a hookfit cleaning tool.

FIG. 5 illustrates an embodiment of a hookfit cleaning tool. The hookfit cleaning tool 300 includes a hookfit block 310 which may include rectangular sides 315 configured to slide within the width of a receiver slot 159 (FIG. 4). The hookfit block 310 further includes side projections 330 configured to be received with the hook fit 157 at a bottom of the receiver slot 139 (FIG. 4). External surfaces (top side 331, a bottom side 332 and an outer side 333) of the sideward projection 330, act as a cleaning element 335 with a coating 336 of an abrasive material. The abrasive coating 335 may also be applied to additional surface areas such as a sidewall area 334 in proximity to the side projections 330 of the hookfit block 310. As the abrasive coating of the side projections 330 and sidewall area 334 engage the inner walls of the hook fit 157, and sidewall 162 and base 161 of the receiver slot 139, trash, rust/oxidation, and other foreign material are cleaned from the wall. The abrasive coating material may preferentially be cubic boron nitride.

As the individual compressor stages may include different size receiver slots and hooks, the invention may include a plurality of hookfit blocks of different sizes such as block width and size of the side projections for cleaning. A rear end of the hook may also include an attachment 345 adapted for forcibly and rotatably engaging a cleaning handle. The attachment 345 may include a clevis block 346 for attachment to a cleaning handle (not shown) with a clevis pin 347.

Figure 6A:
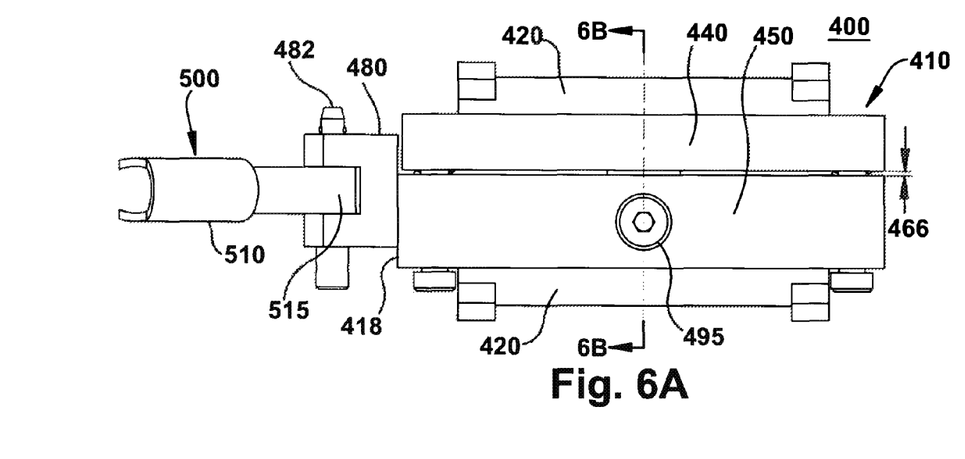
Figure 6B:
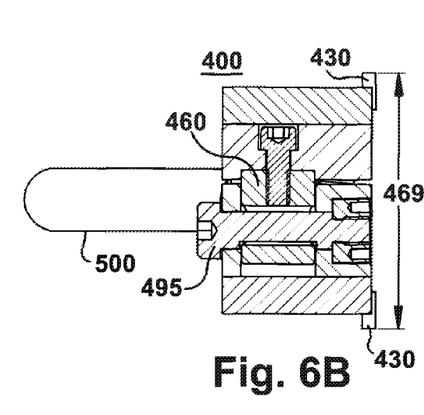
Figure 6C:
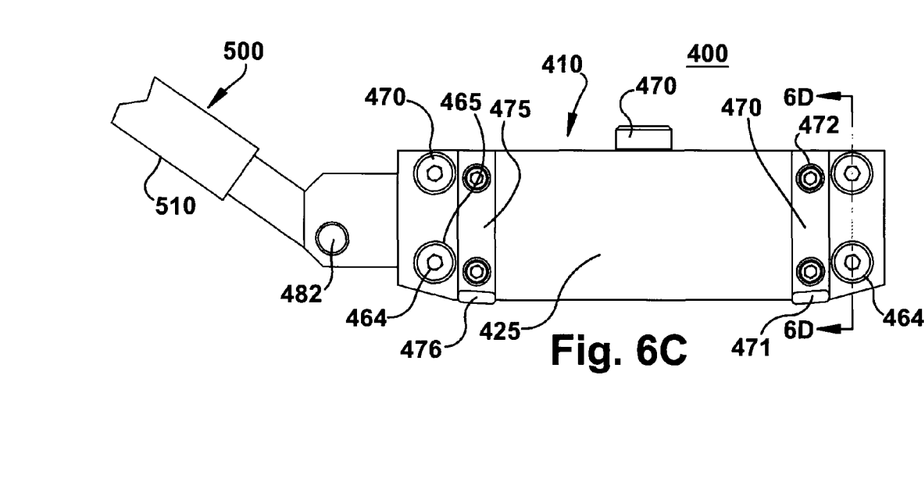
Figure 6D:
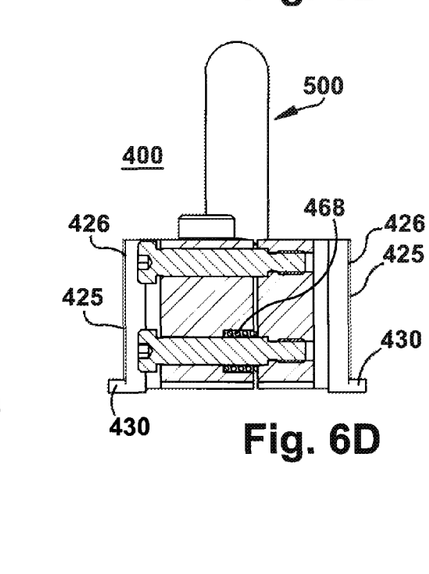

FIGS. 6A-6D illustrates an embodiment of a side wall cleaning tool. FIG. 6A illustrates a top view. FIG. 6B illustrates a sectional view. FIG. 6C illustrates an elevation view. FIG. 6D illustrates another sectional view. The side wall cleaning tool 400 includes a main body 410 adapted to slide within the receiver slot. The main body 410 includes a cleaning pad 420 attached to each side, wherein the cleaning pads are adapted to engage the sidewalls of the receiver slot. The main body 410 further includes side projections 430 adapted to slide within the hook fit of the receiver slot so as to guide the tool through the receiver slot with the cleaning pads 420 aligned against the side walls of the receiver slot. The cleaning pads 420 include an abrasive coating 425 on an outer surface 426 that engage and clean the side walls of the receiver slot. The abrasive coating 425 may include cubic boron nitride.

The main body 410 may include a spreader 440 and a spreader lock plate 450, adapted for setting a width 469 of the main body that is adjustable to a width of the receiver slot that may vary for the different compressor stages. Spacers 460 of predetermined widths may be mounted between the spreader 440 and the spreader lock plate 450 to adjust a width 469 of the main body 410 to achieve engagement between the abrasive coating 425 on the outer walls 426 of the cleaning pad 420 and the side walls of the receiver slot.

The spreader 440, spreader lock plate 450 and spacers 460 may be attached together with a plurality of shoulder screws 465 or other suitable arrangement. A small gap 466 may be provided between the spreader 440 and spreader lockplate 450 wherein a spring 468 positioned along a lower shoulder screw 464 maintains the separation, allowing a small amount of play in the width 469 of the main body 410 so as to adapt to high spots within the hook fit or on the side wall of the receiver slot 139 (FIG. 4) and to maintain the abrasive coating 425 engaged with the sidewall for cleaning. Insertion screw 495 may be turned to engage internals of the main body to compress the width 469 of the main body 410 so as to facilitate entry of the main body into the receiver slot of the compressor casing. When the main body 410 has been placed in the receiver slot, then the width 469 of the main body 410 may be restored for engaging with the side walls of the receiver slot for cleaning by restoring the insertion screw 495 to the original position.

The side projections 430 on the main body 410 may include a hook plate 470 attached with socket head cap screws 472 of varying length or other suitable means. A first hook plate 470 may be provided at a forward portion and a second hook plate 475 may be provided at a rear portion. A first side projection 471 is provided at a bottom of the first hook plate 470 and a second side projection 476 is provided at a bottom of second hook plate 475. The side projections 471, 472 being separated by a length of the main body 410 are configured so as to conform to the arcuate shape of the hook in the receiver slot at the separate locations.

A clevis block 480 mounted on a rear end 418 and adapted for forcibly and rotatably receiving the cleaning handle 500 with a clevis pin 482.

Cleaning elements may need not need to be provided on the bottom of the hook fit cleaning tool or the side wall cleaning tool, as the bottom of the receiver slot does not normally contact the stator ring segment or the blade singlet, thereby avoiding the tough accumulations that require cleaning.

Figure 7:
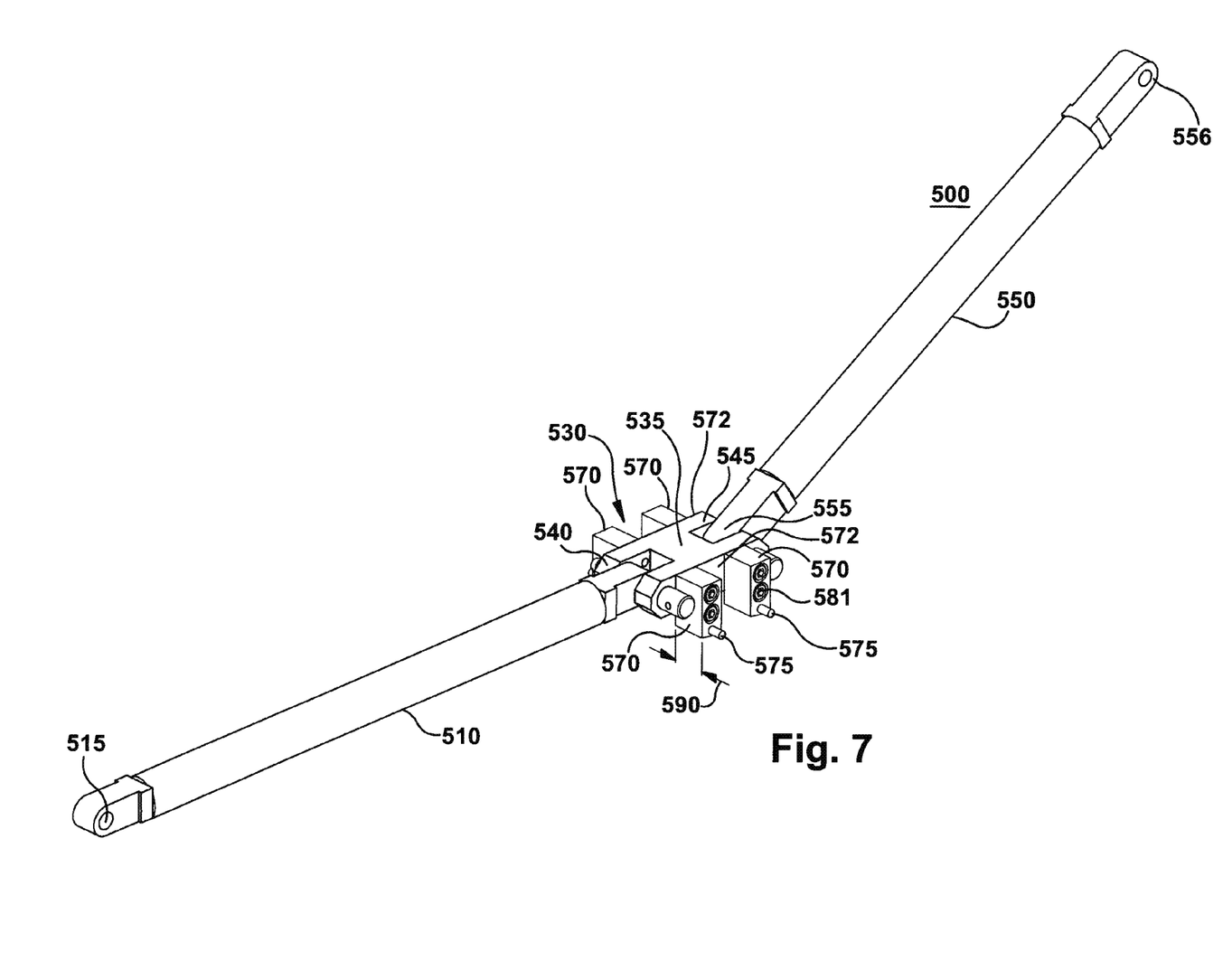
FIG. 7 illustrates a cleaning handle adapted for inserting and retracting the cleaning tools through a receiver slot for cleaning

FIG. 7 illustrates a cleaning handle adapted for inserting and retracting the cleaning tools through receiver slot for cleaning. Cleaning handle 500 includes a first rod 510, including a joint 515 at a forward end adapted to forcibly and rotatably engage at least one of the hookfit cleaning tool and the sidewall cleaning tool. The first rod 510 may also engage forcibly and rotatably at a rear end with an extension clevis 530. The extension clevis 530 may include a body 535 including a front clevis joint 540 and a rear clevis joint 545. The front clevis joint 540 is adapted to forcibly and rotatably engage at least one of the hookfit cleaning tool and the sidewall cleaning tool. A second rod 550 may also be provided which includes clevis joints 555, 556 at a front end and a rear end. The second rod 550 may join with rear joint 545 of the extension clevis 530. The first rod 510 may then be joined with the front clevis joint 540 of extension clevis 530 to extend the overall length of the cleaning handle 500 and facilitate insertion of the cleaning tools to the receiver slot position at the bottom of the casing. The extension clevis joint 530 further assists by allowing rotation of both the first rod 510 and the second rod 550 to negotiate the curvature of the receiver slot. Moreover, the first rod 510 and the second rod 550 may be provided in various lengths, adapted to the size of the receiving slot for a specific compressor stage. The clevis extension 530 may further include a plurality of hook blocks 570 on each outer side 572. Each hook block 570 may include a pin 575 configured to fit within the hook fit of the receiver slot. The pins 575 maintain the clevis extension 530 seated in the receiver slot during the cleaning and help guide the clevis extension 530 along the slot path. Multiple hook blocks 570 of different thickness 590 may be provided for the tool set to adapt the clevis extension 530 to engage properly with receiver slots of different width associated with the individual compressor stages.

The present invention further provides a method for cleaning receiver slots with hook-fits for stator ring segments. According to the method, a first cleaning tool with an abrasive coating and sideward projections in the shape of the hook is slid through the slots using the hook-fit as a guide. A second cleaning tool with an abrasive coating and a formed/machined hook-fit used as a guide while cleaning the receiver slots as it is pushed through the receiver slots. The tools remove trash, oil, rust/oxidation, and other foreign materials from receiving slot. Both tools may attach to a metal rod with two knuckles as part of the handle that connects to and uses the hook-fit as a guide enabling the operator to reach deep into the radius of the compressor case receiver slots and hook-fits located adjacent to and beneath the rotor and rotor blades so that the hook-fit and receiver slot can be thoroughly cleaned.

In more detail, the method may include cleaning both sidewalls 162 with a sidewall cleaning tool 400 for a receiver slot 139 in one stage of the gas turbine compressor from a first side of the compressor casing 116. The step of cleaning both sidewalls 162 with the sidewall cleaning tool 400 includes assembling a side wall cleaning tool and cleaning handle 500, wherein components of the side wall cleaning tool 400 are sized for the receiver slot 139 of the individual compressor stage. The assembly may include selecting an appropriate size spacer for the width 168 of the receiver slot 139.

The assembly may further include assembling the cleaning handle 500 dependent upon the part of the receiver slot being cleaned and the size of the receiver slot for the individual compressor stage. The cleaning handle may be assembled from different size rods and may include a first rod 510 and a second rod 550 with the extension clevis 530 joining the two rods. The cleaning handle 500 is attached to the cleaning tool with the clevis pin.

The method may further include inserting the side wall cleaning tool 400 into a receiver slot at a first side of the gas turbine compressor casing 116 at the horizontal joint 117, using side projections 430 as a guide. A force is applied on an outer end of the cleaning handle 500 to move the side wall cleaning tool 400 through the slot 139 to the bottom of the casing. The cleaning handle 500 may be modified in length and inclusion of the clevis extension 530 to better clean different sections within the arc of the receiver slot 139. Cleaning from the first side of the compressor casing 116 is completed by withdrawing the side wall cleaning tool 400 from the receiver slot.

Although the cleaning handle 500 with extension clevis 530 allows the receiver slot 139 at the bottom of the casing to be cleaned, it does not allow the receiver slot on both sides of the compressor casing to be cleaned from one side of the casing 116.

Both hooks 157 may be cleaned with the hookfit cleaning tool 300 for the receiver slot 139 in one stage of the gas turbine compressor from the first side of the compressor casing 117 at the horizontal joint 118. Cleaning may then shift to the other side of the compressor casing 116 for the other half of the receiver slot 139. The method may include cleaning both sidewalls 162 with the sidewall cleaning tool 400 for a receiver slot 139 in one stage of the gas turbine compressor from a second side of the compressor casing 116 and then cleaning both hooks 157 with the hookfit cleaning tool 300 for the receiver slot in one stage of the gas turbine compressor from the second side of the compressor casing.

The step of cleaning both hooks 157 of the receiver slot 139 with a hookfit cleaning tool 300 may include assembling the hookfit cleaning tool and the cleaning handle 500, wherein components of the hookfit cleaning tool are sized for the individual compressor stage. The assembly may include selection of the proper size hookfit block 310 for the receiver slot of the individual compressor stage. The attachment block 330 may be attached to the selected hookfit block to allow connection with the cleaning rod 500. The hookfit cleaning tool 300 is inserted into a receiver slot at a first side of the gas turbine compressor casing joint, using side projections 330 as a guide. A force is applied on an outer end of the cleaning handle 500 to move the hookfit cleaning tool 300 through the slot 139 to the bottom of the casing 116. The cleaning handle 500 may be adjusted for better cleaning by adding the extension clevis 530 and additional handle extension 550. When cleaning of the hook fit 157 of the receiver slot 139 is completed, the hookfit cleaning tool 300 is withdrawn from the receiver slot.

Following the cleaning with the abrasive cleaning tools, the freed debris remaining in the receiver slot may be vacuumed out with a properly sized flexible vacuum hose.

For cleaning of the receiver slots for other compressor stages, properly sized hookfit cleaning tool and a properly sized side wall cleaning tool are assembled and the cleaning sequence is repeated.

While the above method describes a preferred sequence for cleaning, it is understood that other cleaning sequences may be performed. As an example, for operational reasons, it may be desired to begin cleaning with the hookfit cleaning tool before using the sidewall cleaning tool. Further, it may be needed to repeat a sequence of cleaning more than one time. It may also be needed to clean the abrasive surfaces of the cleaning tools if and when excessive amounts of debris accumulate on the tool. It may also be desirable to extend the cleaning reach as far as possible from one side of the casing into the receiver slot beyond a mid-point at the bottom of the compressor casing and then overreach past the center point when cleaning from the second side of the casing in order to thoroughly clean this least accessible center point.

Figure 8:
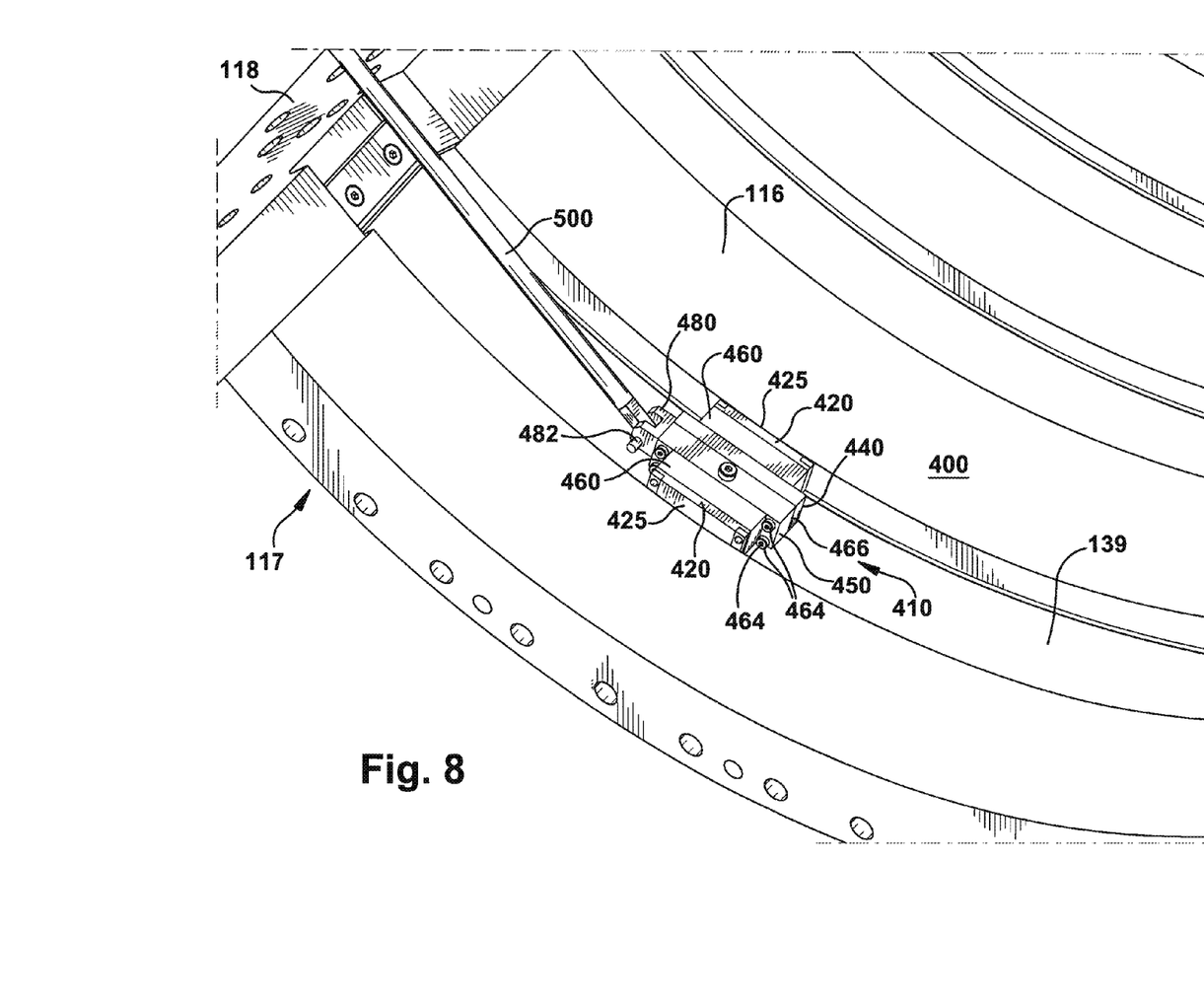
FIG. 8 illustrates a perspective view for a side cleaning tool in a receiver slot for a compressor casing.

FIG. 8 illustrates a perspective view for a side cleaning tool 400 in a receiver slot 139 for a compressor casing 117 at the casing flange 118. The compressor rotor is not shown to provide clarity. The side cleaning tool 400 is adapted to fit within the receiver slot 139 for the individual compressor stage such that cleaning pads 420 with coated abrasive surfaces 425 engage the sidewall for cleaning. Cleaning handle 500 is attached to the side cleaning tool 400 through clevis block 480 and pin 482.

Figure 9:
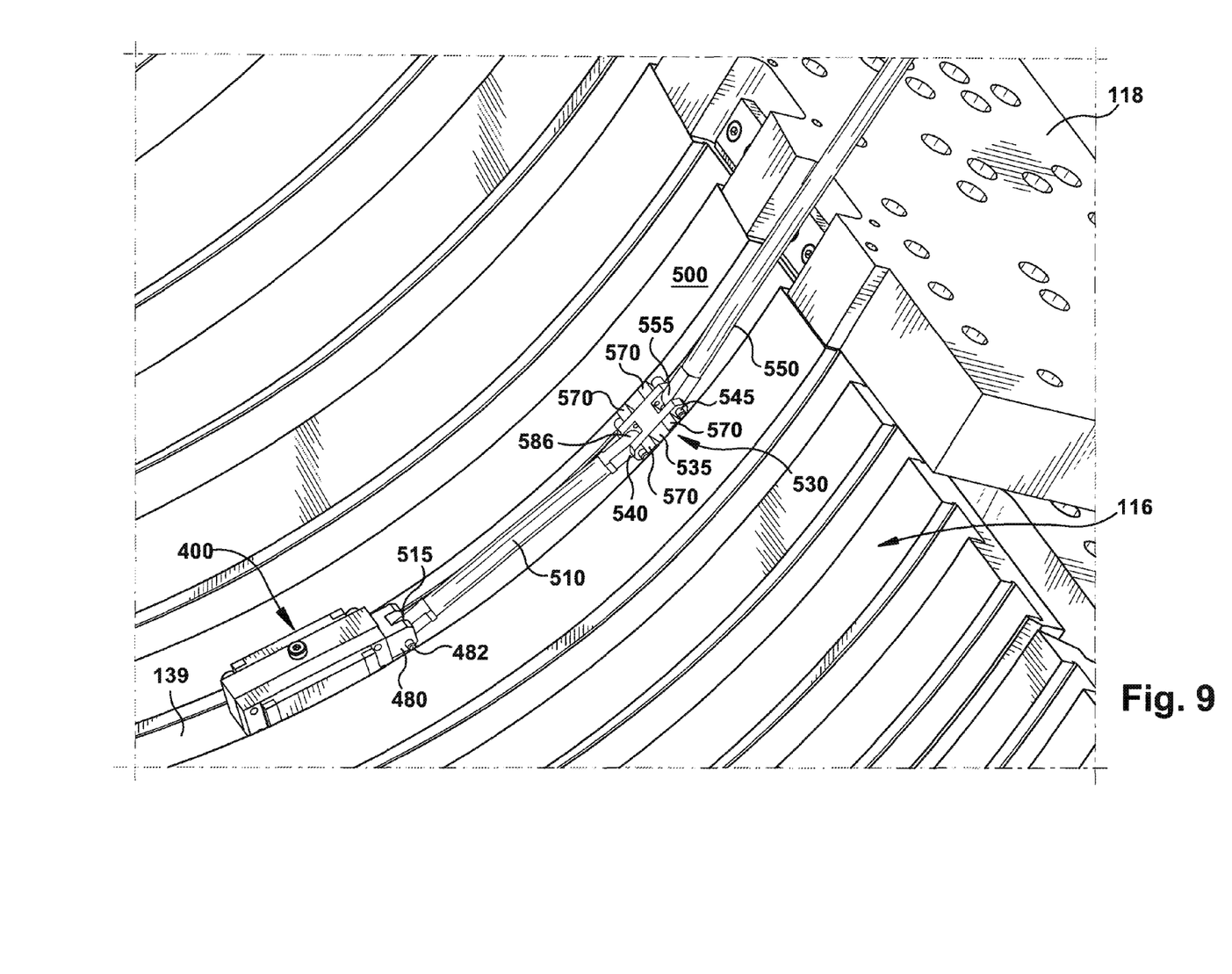
FIG. 9 illustrates another perspective view for a side cleaning tool in a receiver slot being operated by a cleaning handle with extension.

FIG. 9 illustrates another perspective view for a side cleaning tool in a receiver slot being operated by a cleaning handle with extension. The side cleaning tool 400 may be inserted in the receiver slot 139 to the bottom of the compressor casing with the cleaning handle 500 with extension clevis 530, first rod 510 and second rod 550. The rods may be provided in varying lengths. The pins 575 (FIG. 7) on the hook blocks 570 of the extension clevis 530 engage the hook fit 157 of the receiver slot 139 (FIG. 4) retaining the extension clevis 530 seated within the receiver slot 139, thus enabling a pushing or pulling force to be provided to the sidewall cleaning tool 400 at the forward end of rod 510.

Figure 10:
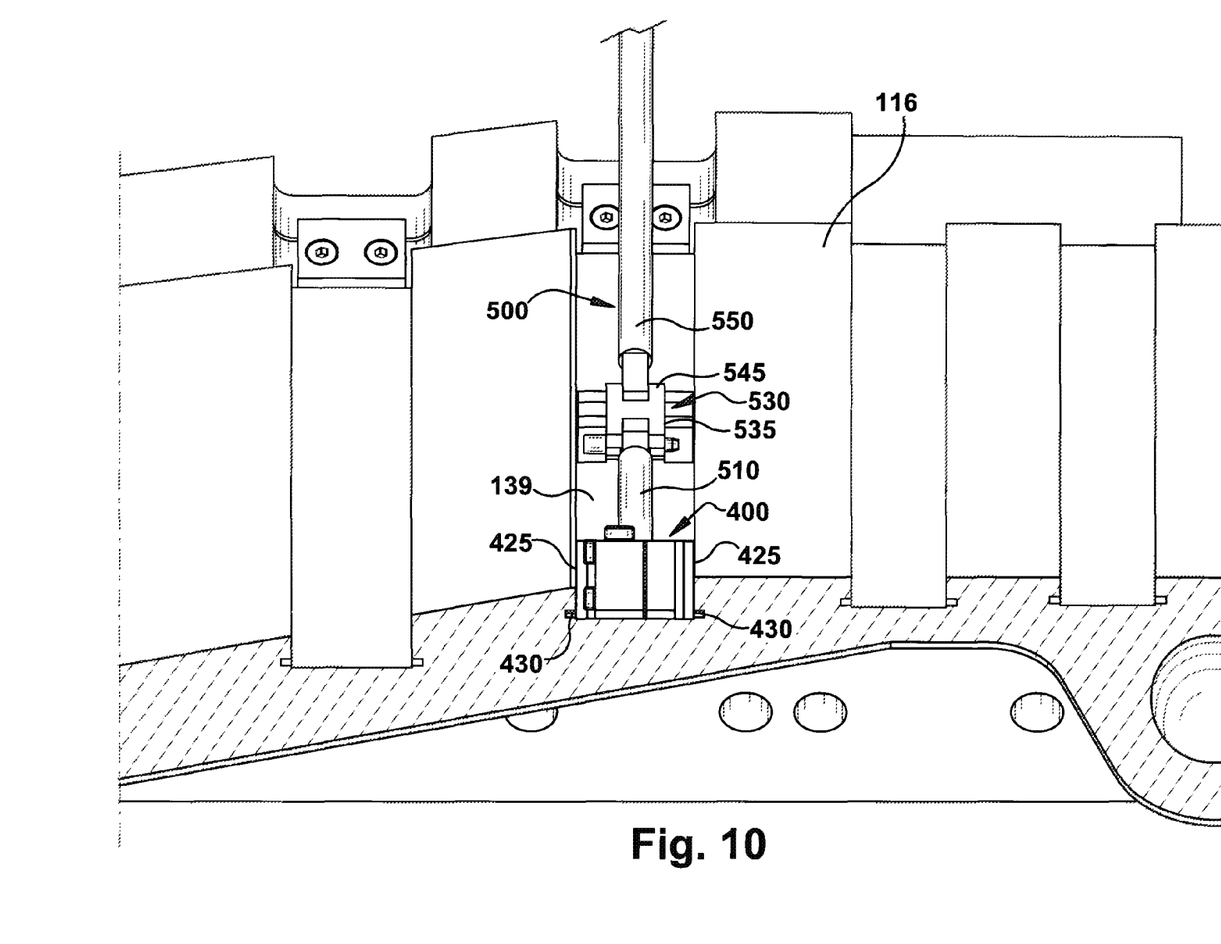
FIG. 10 illustrates a frontal elevation view of the side wall cleaner at a bottom of a receiver slot.

FIG. 10 illustrates a frontal elevation view of the side wall cleaner at a bottom of a receiver slot. The main body 410 of side wall cleaning tool 400 includes cleaning pads 420 with abrasive coating 425 engaging the sidewall 162 of the receiver slot 139. Side projections 430 slide within hook fit 157 of the receiver slot 139, guiding the side wall cleaning tool 400 along the arc path of receiver slot and maintaining the abrasive coating 425 with the side walls 162 for cleaning. Pins 575 of hook blocks 570 engage hook fit 157 (FIG. 4) to maintain the extension clevis 530 seated in the receiver slot 139 and therefore able to transmit pushing and pulling force from second handle 550 to first handle 510 and then to cleaning tool.

Figure 11:
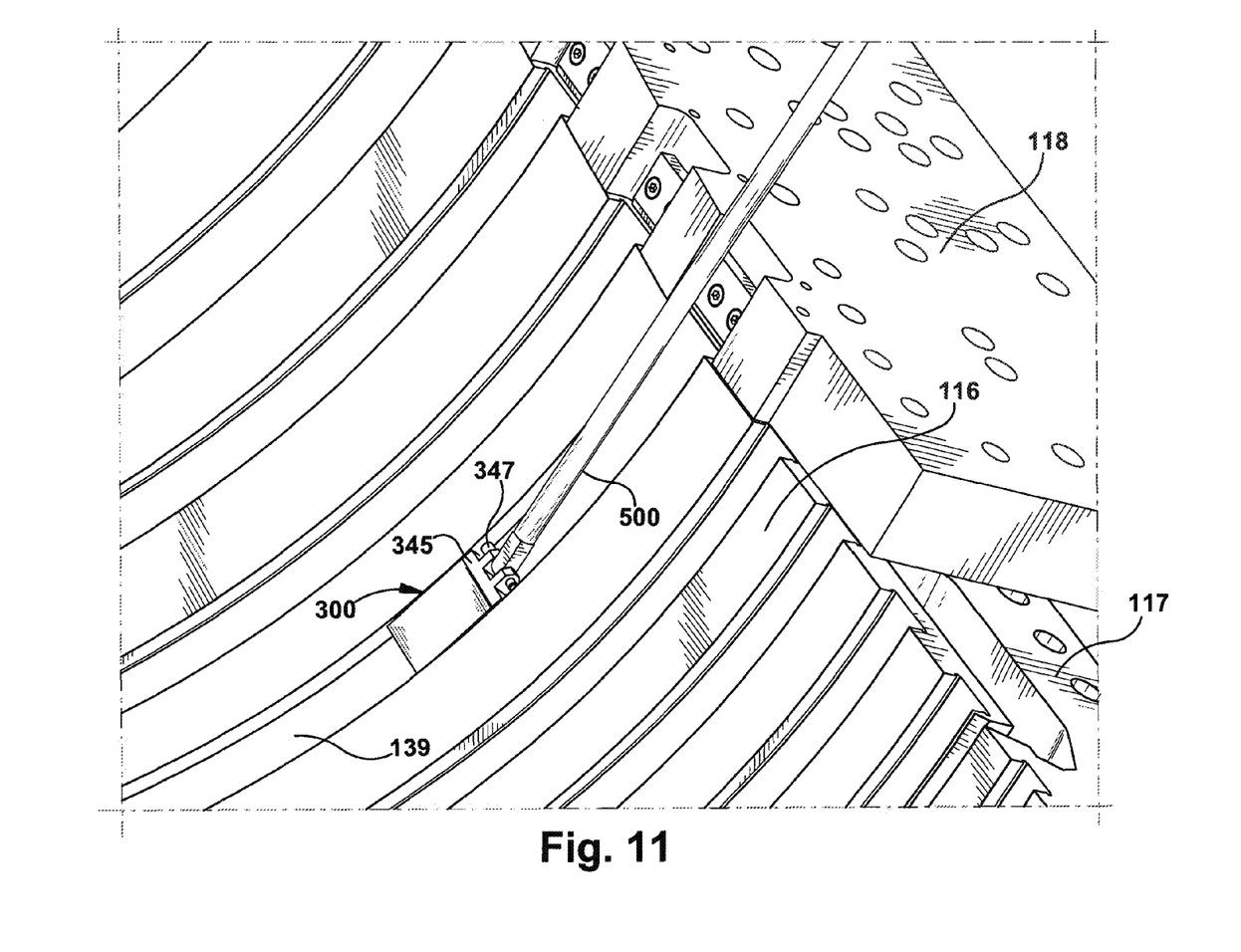
FIG. 11 illustrates a perspective view of a hookfit cleaning tool within a receiver slot.

FIG. 11 illustrates a perspective view of a hook cleaning tool within a receiver slot. The hook cleaning tool 300 is being inserted and withdrawn with cleaning handle 500.

Figure 12:
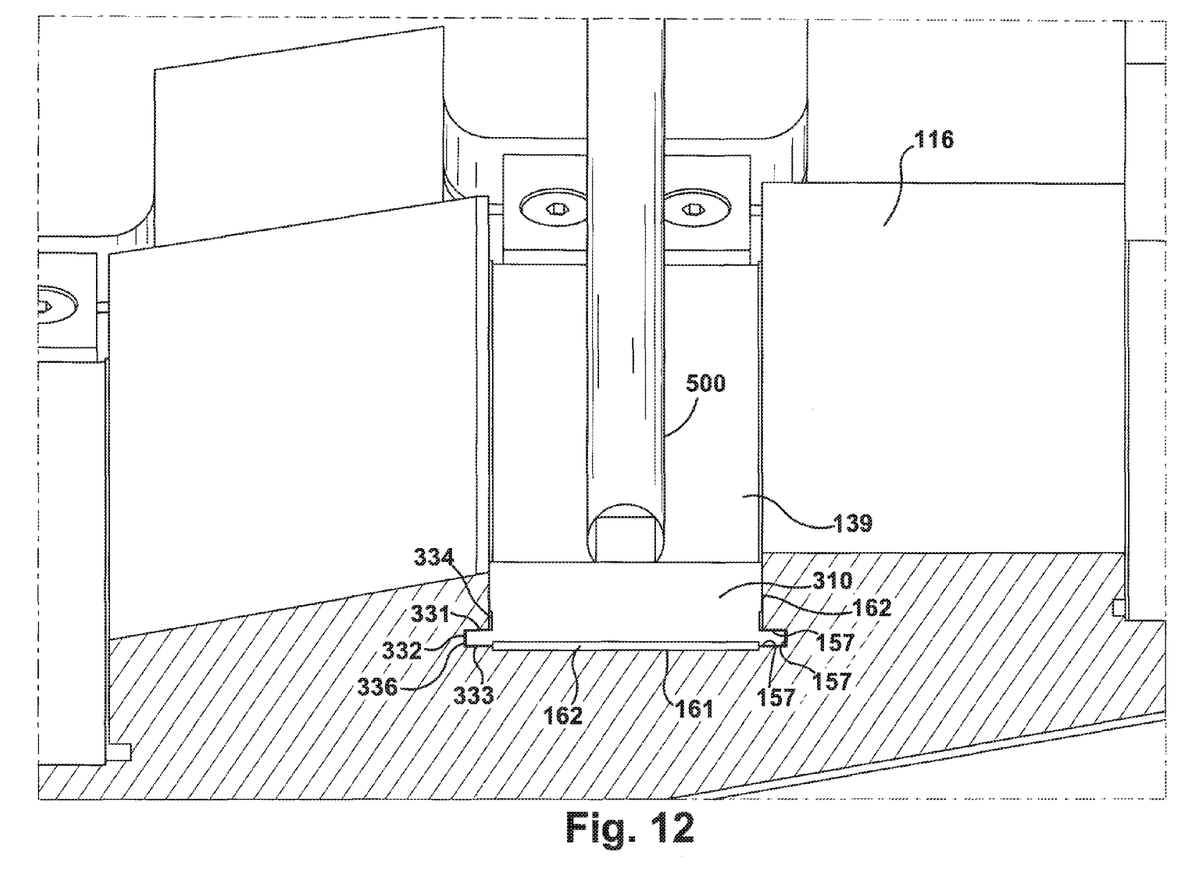
FIG. 12 illustrates a frontal elevation view of the hookfit cleaner at a bottom of a receiver slot.

FIG. 12 illustrates a frontal elevation view of the hookfit cleaner at a bottom of a receiver slot. Hook fit block 310 is maintained within the receiver slot 139 by side projections 330 engaging the receiver slot 139. Cleaning is performed by engagement of abrasive coatings 336 on walls 331, 332, 333, and 334 with the corresponding inner wall of the hook fit 157 and the receiver slot 137. The bottom 161 of the receiver slot 139 may extend below the hoot fit 157 so a small gap 162 exists between the main block 310 and the bottom 161 of the receiver slot. Since the bottom of hookfit cleaning tool 300 does not engage the bottom 161 of the receiver slot 139, the bottom of the receiver slot is not cleaned.

While the invention has been described in terms of various specific embodiments, those skilled in the art will recognize that the invention can be practiced with modification within the spirit and scope of the claims.

What is claimed is:

1. A system adapted for cleaning a plurality of receiver slots for stators of a multistage gas turbine compressor with a rotor in place, the system comprising:
    a hookfit cleaning tool adapted for cleaning hooks within the receiver slot;
    a side cleaning tool adapted for cleaning sidewalls of the receiver slot; and
    a cleaning handle configured for attachment to at least one of the side cleaning tool and the hookfit cleaning tool and adapted for inserting and retracting the side cleaning tool and the hookfit cleaning tool into the receiver slot for cleaning of the receiver slot.

2. The system according to claim 1, the hookfit cleaning tool comprising:
    a hookfit block, configured to slide within the receiver slot, including a plurality of side projections configured to slide within the hooks of the receiver slot for a gas turbine compressor stage, wherein the side projections include a cleaning element adapted to engage the sidewalls of the hooks.

3. The system according to claim 2, the cleaning element comprising:
    a coating of an abrasive material on the external surfaces of the side projections adapted for cleaning the hooks of the receiver slot.

4. The system according to claim 3, the abrasive coating comprising: cubic boron nitride.

5. The system according to claim 2, the hookfit block comprising
    at least one of a plurality of different block sizes and a plurality of different side projection sizes adapted for different receiver slot sizes of the different gas turbine compressor stages.

6. The system according to claim 2, the hookfit cleaning tool further comprising:
    a connecting attachment coupled to a rear end of the hookfit block, adapted to rotatably engaging the cleaning handle.

7. The system according to claim 6, the connecting attachment comprising: a clevis pin block adapted for rotatably engaging the cleaning handle with a clevis pin.

8. The system according to claim 1, the side wall cleaning tool comprising:
    a main body, configured to slide within the receiver slot;
    a plurality of cleaning pads, one cleaning pad attached to each side of the body and adapted to engage the sidewalls of the receiver slot for cleaning;
    a plurality of side projections attached to each side of the body and, adapted to slideably engage the hooks of the receiver slot for guiding the side wall cleaning tool through the receiver slot.

9. The system according to claim 8, the body further comprising: at least one of a plurality of different body sizes and a plurality of different side projection sizes adapted for different receiver slot sizes of the different gas turbine compressor stages.

10. The system according to claim 9, wherein the body further comprises:
    a spacer of a predetermined size removably attached to the main body and adapted to engage the cleaning element with the sidewall of receiver slots of different sizes; and
    a connecting attachment coupled to a rear end of the main body, adapted to rotatably engaging the cleaning handle.

11. The system according to claim 10, the body further comprising: a spring between the main body block and the spacer, providing flexibility in allowing the side projections and sidewall to move within the receiver slot.

12. The system according to claim 11, wherein each of the plurality of cleaning pads includes:
    an abrasive coating on an outer wall; and
    at least one side projection on the outer wall of the cleaning pad configured to slide within the hook of the receiver slot.

13. The system according to claim 12, the abrasive coating comprising:
    cubic boron nitride.

14. The system according to claim 1, the cleaning handle comprising:
    a first rod, including a clevis joint at a forward end adapted to forcibly and rotatably engage at least one of the hookfit cleaning tool and the sidewall cleaning tool,
    a clevis extension, including a rear end clevis joint at a front end clevis joint;
    a second rod including a clevis joint at a forward end adapted to forcibly and rotatably engage with the rear clevis joint of the clevis extension; and
    the first cleaning rod further including a clevis joint at a rear end, adapted to forcibly and rotatably engage with the forward clevis joint of the clevis extension.

15. The system according to claim 14, the clevis extension further comprising:
    a plurality of hook blocks attached to each side of the clevis extension, each hook block including a pin adapted to engage the hook fit of the receiver slot for retaining the clevis extension as it is moved within the receiver slot.

16. A method for cleaning a plurality of receiver slots for stators of a multistage gas turbine compressor with a rotor in place, the method comprising:
    cleaning sidewalls with a sidewall cleaning tool for a receiver slot in one stage of the gas turbine compressor from a first side of the compressor casing;
    cleaning hooks with a hook cleaning tool for a receiver slot in one stage of the gas turbine compressor from the first side of the compressor casing;
    cleaning sidewalls with the sidewall cleaning tool for a receiver slot in one stage of the gas turbine compressor from a second side of the compressor casing; and
    cleaning hooks with the hookfit cleaning tool for a receiver slot in one stage of the gas turbine compressor from the second side of the compressor casing.

17. The method for cleaning according to claim 16, the step of cleaning both sidewalls with a side wall cleaning tool comprising:
    assembling a side wall cleaning tool and cleaning handle, wherein components of the side wall cleaning tool are sized for the individual stage;
    inserting the side wall cleaning tool into a receiver slot at a first side of the gas turbine compressor casing joint, using side projections as a guide;
    applying a force on an outer end of the cleaning handle to move the side wall cleaning tool through the slot to the bottom of the casing; and
    withdrawing the side wall cleaning tool from the receiver slot.

18. The method for cleaning according to claim 17, the step of assembling a side wall cleaning tool and cleaning handle further comprising:
    selecting a spacer sized to the individual width of the receiver slot for the individual stage;
    attaching the spacer to a main block;
    attaching a cleaning pad to each side of the cleaning tool; and
    attaching side projection holder to each side of the cleaning tool.

19. The method for cleaning according to claim 17, further comprising:
    attaching a handle to the side wall cleaning tool.

20. The method for cleaning according to claim 16, the step of cleaning both sidewalls with a hookfit cleaning tool comprising:
    assembling a hookfit cleaning tool and cleaning handle, wherein components of the hookfit cleaning tool are sized for the individual stage;
    inserting the hookfit cleaning tool into a receiver slot at a first side of the gas turbine compressor casing joint, using side projections as a guide;
    applying a force on an outer end of the cleaning handle to move the hookfit cleaning tool through the slot to the bottom of the casing; and
    withdrawing the hookfit cleaning tool from the receiver slot.

\* \* \* \* \*